United States Patent
Mohr et al.

(10) Patent No.: US 9,931,723 B2
(45) Date of Patent: Apr. 3, 2018

(54) METHOD OF OPERATING A CUTTING SYSTEM, AND COLLAR ASSEMBLY AND COLLAR MEMBER THEREFOR

(71) Applicant: EATON CORPORATION, Cleveland, OH (US)

(72) Inventors: Darron Robert Mohr, Painted Post, NY (US); Christopher Alan Arnold, Erin, NY (US); Steven Christopher Randall, Horseheads, NY (US); Timothy Arnold Thompson, Dundee, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 22 days.

(21) Appl. No.: 15/208,689

(22) Filed: Jul. 13, 2016

(65) Prior Publication Data
US 2018/0015582 A1    Jan. 18, 2018

(51) Int. Cl.
*B23Q 11/00* (2006.01)
*B23Q 11/10* (2006.01)
(Continued)

(52) U.S. Cl.
CPC .............. *B23Q 11/10* (2013.01); *B23C 1/06* (2013.01); *B23Q 11/123* (2013.01); *B23C 2250/12* (2013.01)

(58) Field of Classification Search
CPC ..... B23Q 11/10; B23Q 11/123; B23Q 11/148; B23Q 11/145; B23Q 11/14; B23Q 11/006; B23C 1/06
See application file for complete search history.

(56) References Cited

U.S. PATENT DOCUMENTS 2,235,582 A * 3/1941 Klema ............... B23Q 11/1084
                                                        239/289
3,868,195 A * 2/1975 Anderson ........... B23Q 11/1076
                                                        184/6.26
(Continued)

FOREIGN PATENT DOCUMENTS

WO    WO 2004091861 A1 *  10/2004 ............. B24B 3/346

OTHER PUBLICATIONS http://www.hhrobertsmachinery.com/Accessories/Spidercool/spidercool.htm, "SpiderCool Automated Coolant Nozzles for CNC Machines", H.H. Roberts Machinery Limited.
(Continued)

*Primary Examiner* — Alan Snyder
(74) *Attorney, Agent, or Firm* — Eckert Seamans (57) ABSTRACT

A collar member is for a collar assembly of a cutting system and method. The cutting system has a spindle and a cutting tool coupled to the spindle. The collar assembly includes a number of components and a gas flow system having a number of gas flow delivery apparatus and a number of conduits. The collar member includes a support portion structured to be coupled to the spindle, and a chamber portion extending from the support portion and being structured to be coupled to each of the number of components, the number of gas flow delivery apparatus, and the number of conduits. The support portion has a side portion having an edge portion defining a thru hole in order to form a passageway from an interior of the support portion to an exterior thereof.

15 Claims, 6 Drawing Sheets

(51) Int. Cl.
*B23C 1/06* (2006.01)
*B23Q 11/12* (2006.01)

(56) References Cited

U.S. PATENT DOCUMENTS

| | | | | |
|---|---|---|---|---|
| 4,669,933 A | * | 6/1987 | Dye | B23Q 1/0036 |
| | | | | 279/20 |
| 4,778,315 A | * | 10/1988 | Duffy | B23Q 11/005 |
| | | | | 29/DIG. 78 |
| 6,471,573 B1 | * | 10/2002 | Reitmeyer | B24B 5/00 |
| | | | | 451/446 |
| 2004/0013480 A1 | * | 1/2004 | Beckington | B23Q 1/0036 |
| | | | | 408/61 |
| 2009/0209400 A1 | * | 8/2009 | Bahr | B23Q 3/157 |
| | | | | 483/43 |
| 2011/0318123 A1 | * | 12/2011 | Leishman | B23Q 11/10 |
| | | | | 408/1 R |

OTHER PUBLICATIONS http://www.cnccookbook.com/CCCNCMillFeedsSpeedsCoolant.htm, SpiderCool Automated Coolant Nozzles for CNC Machines, CNC Milling Feeds and Speeds Cookbook, "Coolant and Chip Clearing".
http://www.mmsonline.com/articles/where-dry-milling-makes-sense, "Where Dry Milling Makes Sense." Article From Oct. 15, 2000 Modern Machine Shop, Peter Zelinski, Senior Editor.
http://www.fogbustercom/, "The FogBuster is a revolutionary non-fogging sprayer that uses Green Technology to stop pollution in the work environment," Fog Buster Coolant Sprayers.

* cited by examiner

METHOD OF OPERATING A CUTTING SYSTEM, AND COLLAR ASSEMBLY AND COLLAR MEMBER THEREFOR

BACKGROUND

Field

The disclosed concept relates to methods of operating a cutting system. The disclosed concept further relates to collar assemblies for cutting systems. The disclosed concept also relates to collar members for cutting system collar assemblies.

Background Information

Cutting systems, such as milling systems, are employed to cut and remove material from components (e.g., without limitation, separable electrical contacts employed in vacuum switching apparatus). In order to manufacture the separable electrical contacts, milling systems perform cutting operations on stocks of material (e.g., without limitation, a copper bar). Known milling systems typically include a spindle that is coupled to a cutting tool. During the cutting operation, oil lubricates the spindle and the cutting tool. A significant drawback of known milling systems is that the oil often flows from the cutting tool onto the working part (e.g., the respective separable electrical contact being worked on). This oil flow undesirably contaminates the separable electrical contact, which in turn causes it to more easily fail during operation of the vacuum switching apparatus. Another significant drawback of known cutting systems is heat buildup, such as, for example and without limitation, heat buildup between the cutting tool and the separable electrical contact being worked on. This heat buildup undesirably shortens the life of the cutting tool and also causes the separable electrical contact being worked on to burn. Furthermore, the heat buildup also creates a significantly large number of burrs. When the burrs are removed, imperfections undesirably result in the separable electrical contact being worked on, thereby providing another source for failure.

There is, therefore, room for improvement in methods of operating a cutting system, and in collar assemblies and collar members therefor.

SUMMARY

These needs and others are met by embodiments of the disclosed concept, which are directed to an improved method of operating a cutting system, and collar assembly and collar member therefor.

As one aspect of the disclosed concept, a collar member for a collar assembly of a cutting system is provided. The cutting system has a spindle and a cutting tool coupled to the spindle. The collar assembly includes a number of components and a gas flow system having a number of gas flow delivery apparatus and a number of conduits. The collar member comprises a support portion structured to be coupled to the spindle, and a chamber portion extending from the support portion and being structured to be coupled to each of the number of components, the number of gas flow delivery apparatus, and the number of conduits. The support portion has a side portion having an edge portion defining a thru hole in order to form a passageway from an interior of the support portion to an exterior thereof.

As another aspect of the disclosed concept, a collar assembly including the aforementioned collar member is provided.

As yet another aspect of the disclosed concept, a method of operating a cutting system is provided. The cutting system includes a spindle, a cutting tool coupled to the spindle, and a collar assembly. The collar assembly has a number of components and a collar member. The collar member includes a support portion coupled to the spindle, and a chamber portion extending from the support portion and being coupled to each of the number of components. The method comprises the steps of providing a side portion of the support portion with an edge portion defining a thru hole in order to form a passageway from an interior of the support portion to an exterior thereof, coupling one of the number of components to the edge portion, coupling a tubular member to the one of the number of components, coupling a pump apparatus to the tubular member, and pumping oil from the interior of the support portion through the one of the number of components and the tubular member with the pump apparatus.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the statement that two parts are "connected" together shall mean that the parts are joined together directly.

As employed herein, the term "precision tip member" shall mean a component having a thru hole, and in which a wall of the component that defines the thru hole has a varying opening size (i.e., a cord length defining an opening). For example and without limitation, the wall of the component may have a first opening size (e.g., without limitation, a first diameter) at a first end that is greater than a second opening size (e.g., without limitation, a second diameter) at a second end.

Figure 1:
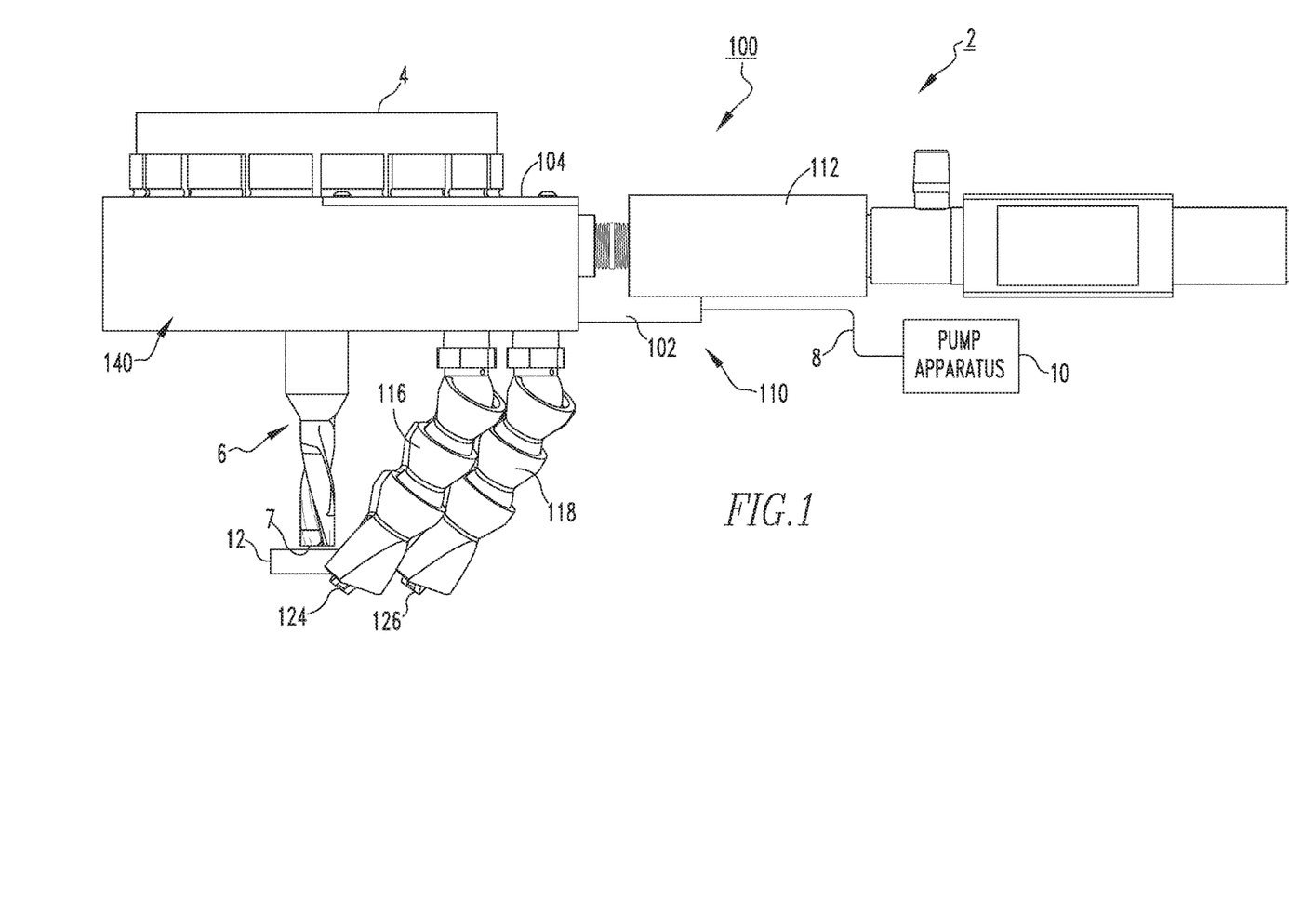
FIG. 1 is a simplified elevation view of a cutting system, in accordance with a non-limiting embodiment of the disclosed concept.

FIG. 1 shows a simplified view of a cutting system (e.g., without limitation, milling system 2), in accordance with a non-limiting embodiment of the disclosed concept. The example milling system 2 includes a spindle 4 (shown in simplified form), a cutting tool 6 coupled to the spindle 4, a tubular member (e.g., without limitation, hose 8, shown in simplified form), and a pump apparatus 10 (shown in simplified form) fluidly coupled to the hose 8. The spindle 4 and the cutting tool 6 cooperate with one another in a generally well known manner in order to cut and remove material from a component (e.g., without limitation, a separable electrical contact 12, shown in simplified form).

As will be discussed in greater detail below, the milling system 2 further has a novel collar assembly 100 that cooperates with the spindle 4 and the cutting tool 6, and advantageously allows the separable electrical contact 12 to be machined dry, without any undesirable contamination from lubrication oil (e.g., without limitation, oil located on the spindle 4 and the cutting tool 6). This is distinct from prior art milling systems (not shown) in which runoff lubrication oil undesirably contaminates and compromises the integrity of components (e.g., without limitation, separable electrical contacts) being worked on. Furthermore, the example collar assembly 100 provides a novel mechanism to reduce heat buildup during machining of the separable electrical contact 12, thereby lengthening the life of the cutting tool 6, preventing undesirable burning of the separable electrical contact 12, and significantly reducing the number of burrs created as a result of heat. Additionally, the orientation of the individual components of the collar assembly 100 allows the cutting tool 6 to be installed and removed automatically without any undesirable interference from components of the milling system 2.

Figure 2:
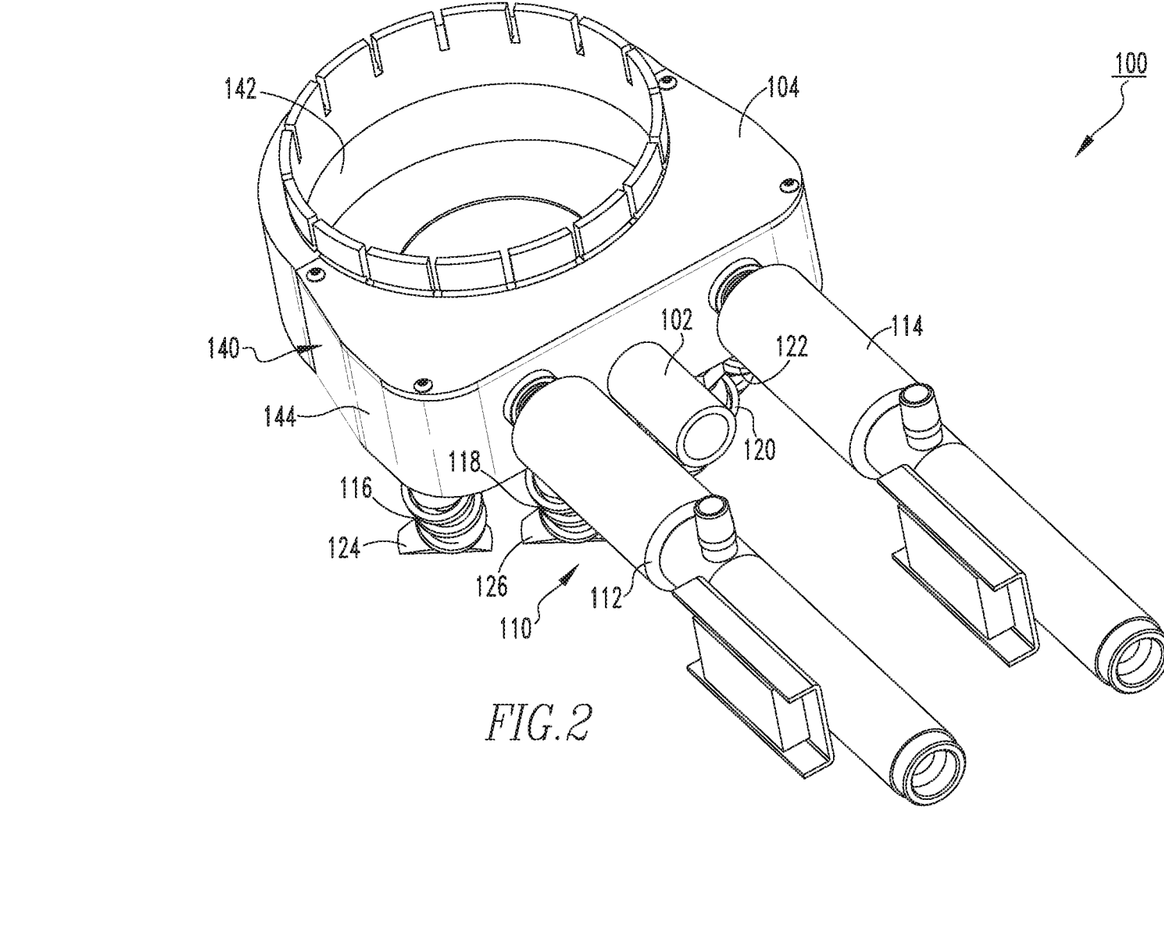
FIG. 2 is a front isometric view of a collar assembly for the cutting system of FIG. 1.

FIG. 2 shows an isometric view of the collar assembly 100. As seen, the collar assembly 100 includes a pipe member 102, an enclosure member 104, a gas flow system 110, and a collar member 140. The pipe member 102 is fluidly coupled to the hose 8 (FIG. 1) and provides a passageway through which lubrication oil can be pulled from an interior of the collar member 140 to an exterior thereof, as will be discussed below. The gas flow system 110 includes a number of gas flow delivery apparatus (e.g., without limitation, cold gas guns 112,114), a number of conduits (e.g., without limitation, hoses 116,118,120,122), and a number of precision tip members (only two precision tip members 124,126 are shown) each fluidly coupled to a corresponding one of the hoses 116,118,120,122. The cold gas guns 112,114 and the hoses 116,118,120,122 are each coupled to the collar member 140 in order to deliver a relatively steady flow of cold gas (e.g., without limitation, gas at or below 11 degrees Celsius) to the cutting tool 6 and the separable electrical contact 12, as will be discussed below.

Figure 3:
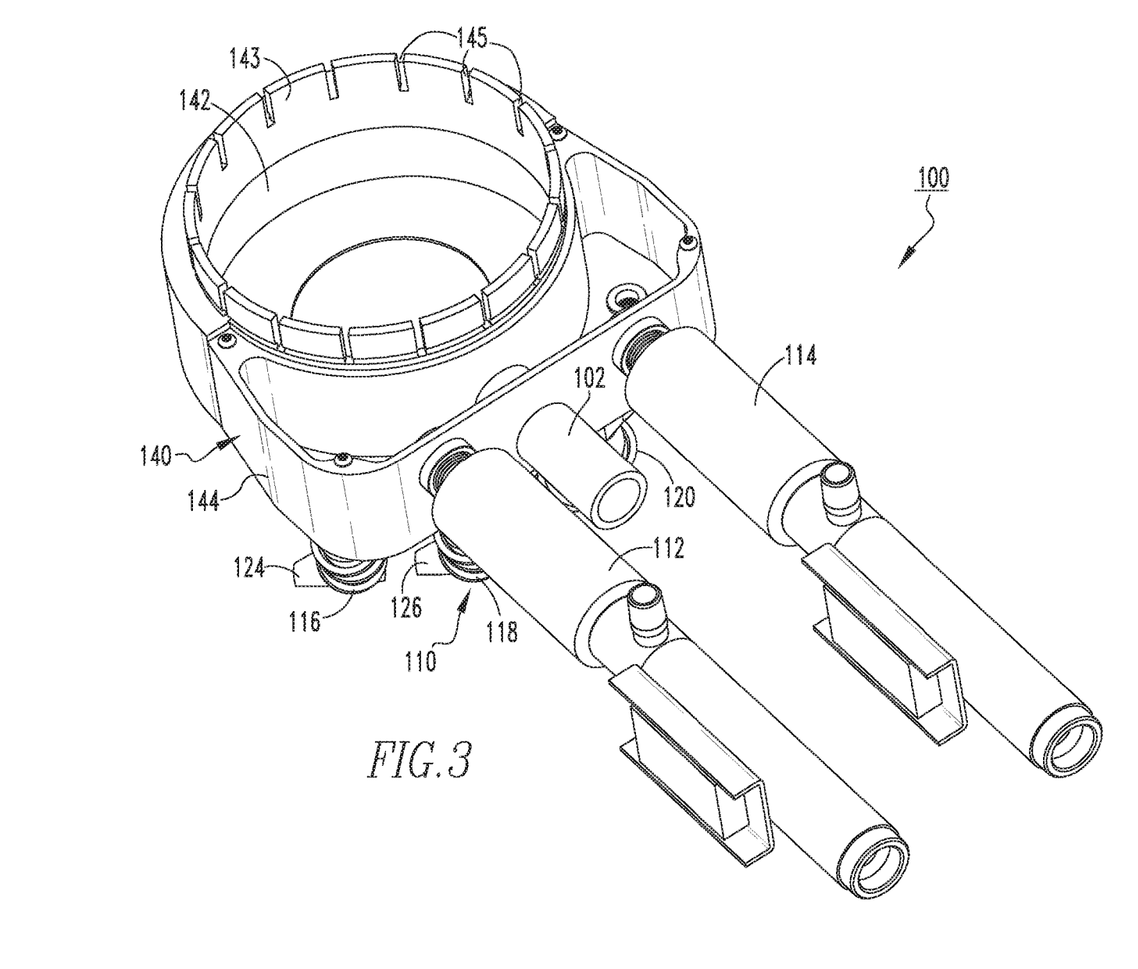
FIG. 3 is a front isometric view of the collar assembly of FIG. 2, shown with the enclosure member removed in order to see hidden structures.
Figure 4:
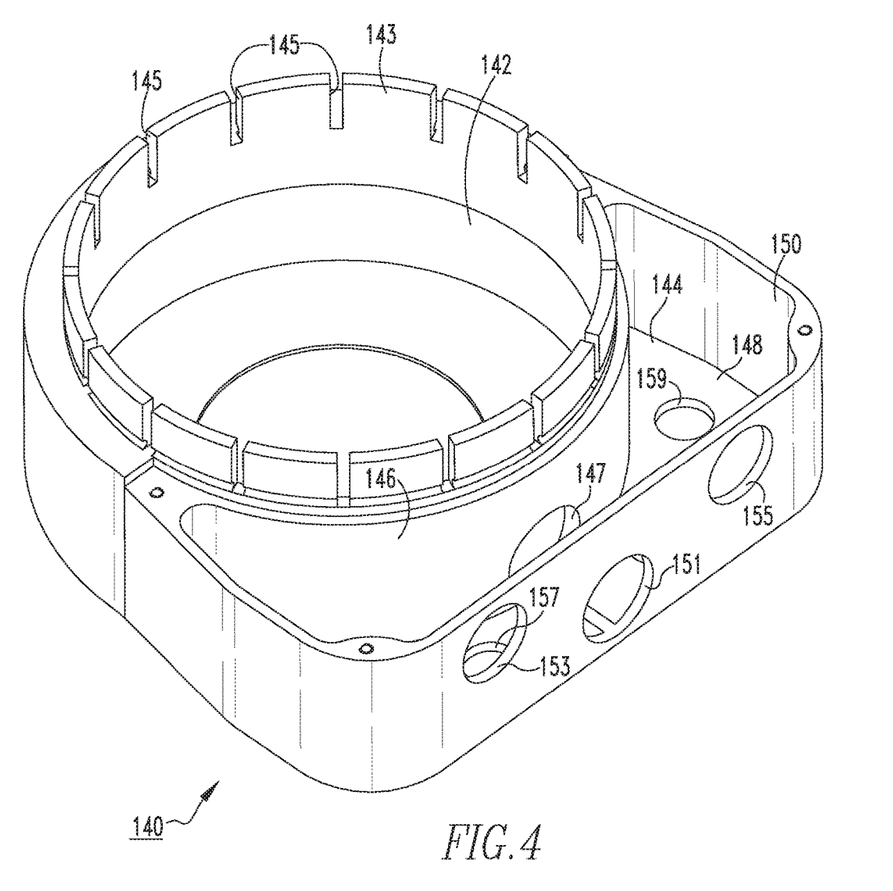
FIG. 4 is a front isometric view of a collar member for the collar assembly of FIG. 3.

FIG. 3 shows another isometric view of the collar assembly 100, and shown without the enclosure member 104 (FIG. 2). FIGS. 4-7 show isometric, elevation, plan, and section views, respectively, of the collar member 140. In one exemplary embodiment, the collar member 140 is a unitary component made of a single piece of material, thereby simplifying manufacturing and reducing costs. As seen in FIG. 4, the collar member 140 includes an annular-shaped support portion 142 and a chamber portion 144 extending from the support portion 142. In operation, the spindle 4 (FIG. 1) is coupled to and is reliably retained in the support portion 142. More specifically, the support portion 142 has an annular-shaped end portion 143 having a plurality of slits 145 that are generally evenly spaced from one another. By being evenly spaced, the slits 145 allow the collar member 140 to clamp relatively tightly to the spindle 4 (FIG. 1), thus allowing for more flexibility and proper compression around the spindle 4.

Figure 5:
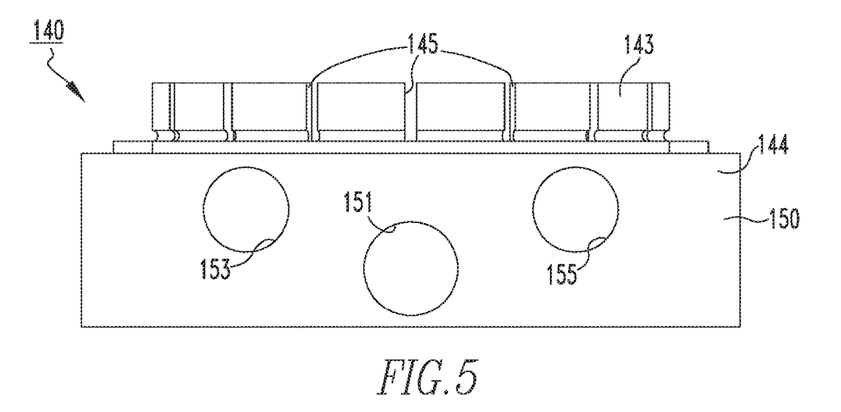
FIG. 5 is an elevation view of the collar member of FIG. 4.
Figure 6:
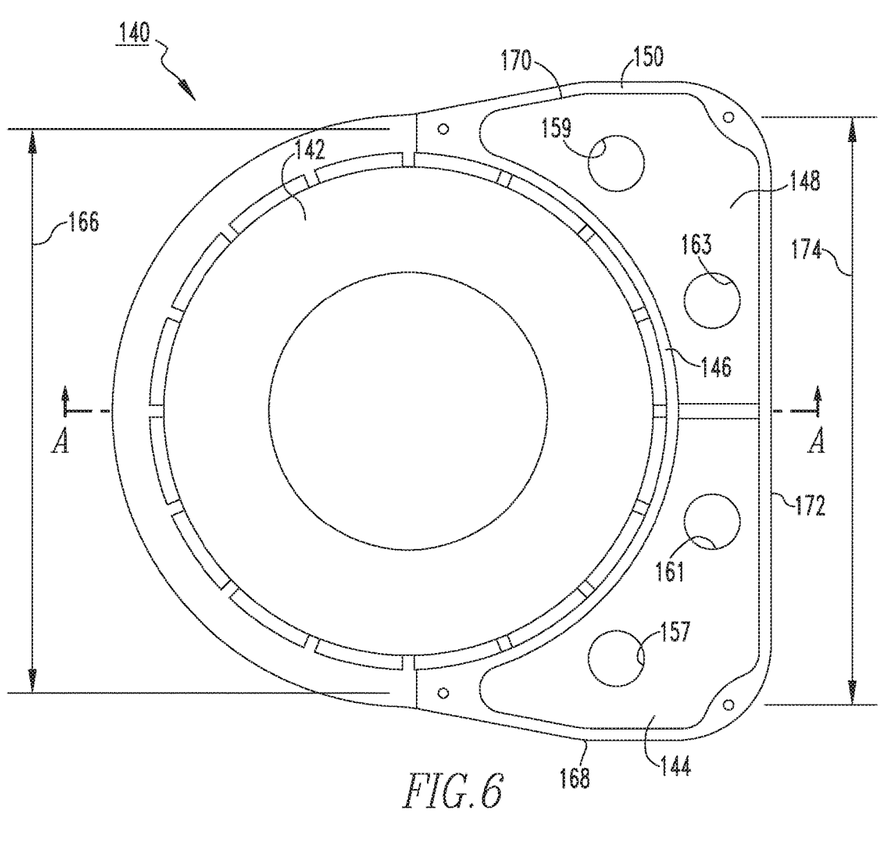
FIG. 6 is a plan view of the collar member of FIG. 5.
Figure 7:
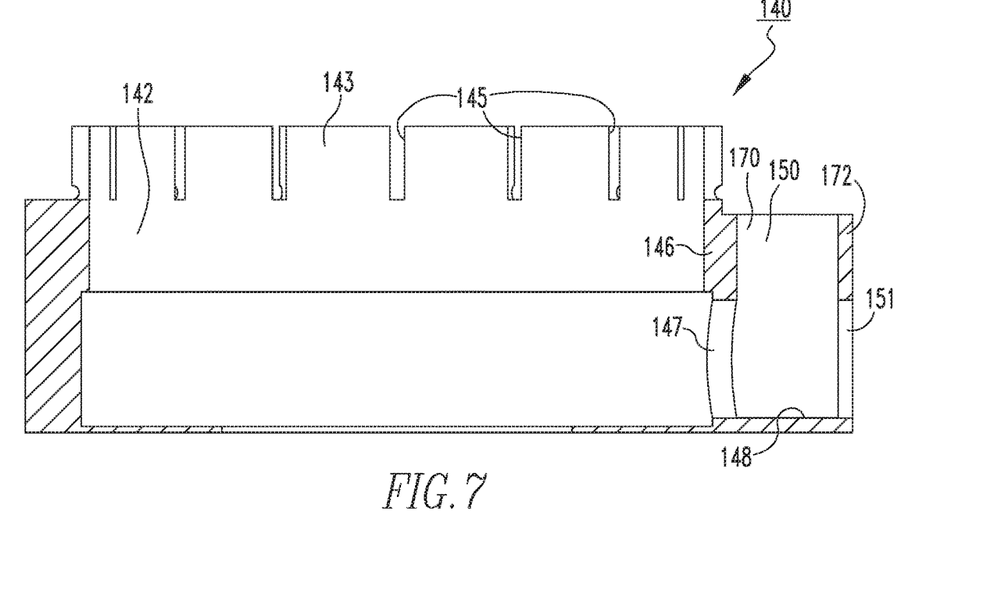
FIG. 7 is a section view of the collar member of FIG. 6, taken along line A-A of FIG. 6.

The chamber portion 144 has a floor portion 148 and a wall portion 150 extending from and being perpendicular to the floor portion 148. Referring to FIG. 5, the wall portion 150 has a number of edge portions 151,153,155 that each define a respective thru hole. As seen in FIG. 6, the floor portion 148 has a number of edge portions 157,159,161,163 that each define a respective thru hole. The cold gas guns 112,114 are each coupled to a corresponding one of the edge portions 153,155 and the hoses 116,118,120,122 FIG. 2 are each coupled to a corresponding one of the edge portions 157,159,161,163. In operation, the enclosure member 104, which is shaped substantially the same as the floor portion 148, and is located opposite and parallel to the floor portion 148, is sealingly coupled to the wall portion 150 in order to form a contained, generally impervious (i.e., except for passageways via the cold gas guns 112,114 and the hoses 116,118,120,122) mixing chamber for cold gas.

More specifically, when the separable electrical contact 12 (FIG. 1) is being worked on, cold gas is delivered by the cold gas guns 112,114 through the respective edge portions 153,155. Although it is preferred to have the cold gas guns be as similar as possible, it is to be expected that cold gas from the cold gas gun 112 enters the chamber portion 144 at a different pressure than cold gas from the cold gas gun 114. However, because the two streams of cold gas are mixed in the chamber portion 144, the resulting mixed pressurized cold gas is advantageously delivered to each of the hoses 116,118,120,122 (i.e., through each of the corresponding edge portions 157,159,161,163) at the same pressure. That is, the pressure of the resulting mixed gas in the chamber portion 144 is the same, which in turn results in the pressure of the cold gas delivered to each of the hoses 116,118,120, 122 advantageously being the same. As a result, pressurized mixed gas advantageously exits each of the respective precision tip members 124,126 at a constant pressure, thereby providing a reliable mechanism by which to cool the cutting tool 6 (FIG. 1) and the separable electrical contact 12 (FIG. 1). The constant pressure advantageously allows for heat removal and chip evacuation, thus preventing the cutting tool 6 (FIG. 1) and the separable electrical contact 12 (FIG. 1) from overheating, thereby avoiding an undesirable catastrophic failure or melting of material. The novel design also reduces the noise decibels (i.e., as compared to prior art cutting systems, not shown) and increases efficiency of gas flow.

Furthermore, each respective precision tip member 124, 126 advantageously delivers a localized stream of cold gas to the cutting tool 6 (FIG. 1) and the separable electrical contact 12 (FIG. 1) by virtue of the varying opening size of the wall of each respective precision tip member 124,126. That is, the opening size of the precision tip members 124,126 decrease from a respective connection point with the respective hoses 116,118,120,122 toward a respective opposing end portion of the precision tip members 124,126. It will also be understood that the localized streams of cold gas provide a reliable mechanism by which burrs can be removed during the cutting process. That is, cold gas exiting the precision tip members 124,126 advantageously blows and thus removes burrs from the cutting area.

Additionally, the disclosed configuration of the novel collar assembly 100 advantageously simplifies tool changes. More specifically, as best seen in FIG. 1, each of the respective hoses 116,118 (i.e., and the hoses 120,122, seen in FIG. 2) and the respective precision tip members 124,126

(i.e., and the other precision tip members corresponding to the hoses 120,122, not shown) are located on a corresponding side of the cutting tool 6. This can be further appreciated with reference to FIG. 6, which shows the edge portions 157,159,161,163 being located between a side portion 146 of the support portion 142 and the wall portion 150. Accordingly, during tool changes, interference with the hoses 116,118,120,122 and the precision tip members 124,126 is significantly reduced and/or eliminated, as the cutting tool 6 can be manipulated entirely from a side opposite the hoses 116,118,120,122 and the precision tip members 124,126.

Referring again to FIG. 4, the side portion 146 has an edge portion 147 defining a thru hole. The pipe member 102 (FIGS. 1-3) is coupled (e.g., without limitation, welded) to the edge portions 147,151, thus providing a passageway through the chamber portion 144. As seen in FIG. 1, the hose 8 is coupled to the pipe member 102. In this manner, the pump apparatus 10, which is also coupled to the hose 8, is advantageously able to remove oil and contaminants from an interior region of the support portion 142 (i.e., proximate the spindle 4). This significantly reduces and potentially eliminates contamination from lubrication oil between the spindle 4 and the collar member 140 onto the separable electrical contact 12 (FIG. 1). More specifically, the separable electrical contact 12 is able to be machined dry, distinct from prior art milling systems (not shown), in which lubrication oil often runs down cutting tools onto, and thus contaminating and compromising the integrity of, parts being worked on. That is, the cold gas cools the cutting tool 6 and the separable electrical contact 12, and also removes burrs created during the cutting operation. Because the cold gas guns 114,116 cool the cutting tool 6 and the separable electrical contact 12, tool life is advantageously lengthened and the likelihood of burning and/or melting of the separable electrical contact 12 during cutting is significantly reduced. That is, unlike prior art milling systems (not shown), in which oil often undesirably flows down cutting tools onto parts, and in which heat buildup often burns parts and reduces tool life, the milling system 2 advantageously overcomes such disadvantages by employing the novel collar assembly 100.

As seen in FIG. 6, the support portion 142 is generally annular-shaped and has a diameter 166. The wall portion 150 has a first end portion 168, a second end portion 170 located opposite the first end portion 168, and a middle portion 172 extending between the first end portion 168 and the second end portion 170. The first end portion 168 and the second end portion 170 each extend from the support portion 142. The middle portion 172 is spaced from the support portion 142. The middle portion 172 is generally planar and has a length 174 substantially the same as the diameter 166 of the support portion 142. As a result, this feature of the collar member 140 provides operators with desirable clearance room to load tools (e.g., without limitation, the cutting tool 6, shown in FIG. 1) into the spindle 4 (FIG. 1).

Furthermore, it will be appreciated that a method of operating the milling system 2 (FIG. 1) includes the steps of providing a side portion 146 of the support portion 142 with an edge portion 147 defining a thru hole in order to form a passageway from an interior of the support portion 142 to an exterior thereof, coupling one of the number of components 102 to the edge portion 147, coupling a tubular member 8 to the component 102, coupling a pump apparatus 10 to the tubular member 8, and pumping oil from the interior of the support portion 142 through the component 102 and the tubular member 8 with the pump apparatus 10. The method further includes the steps of providing a gas flow system 110 with the collar assembly 100, the gas flow system 110 including a number of gas flow delivery apparatus 112,114 and a number of conduits 116,118,120,122 each coupled to the collar member 140, employing each of the gas flow delivery apparatus 112,114 to deliver a corresponding flow of gas into the chamber portion 144, mixing each corresponding flow of gas in the chamber portion 144, and passing the mixed gas through each of the number of conduits 116,118,120,122. Additionally, the method includes the step of exiting the mixed gas through each of the number of conduits 116,118,120,122 at a temperature at or below 11 degrees Celsius. Furthermore, the cutting tool 6 has a distal end portion 7 located opposite the collar member 140. The method includes the step of passing the mixed gas through each of the precision tip members 124,126 proximate the distal end portion 7.

Although the disclosed concept has been described herein in association with the two cold gas guns 112,114, the four hoses 116,118,120,122, and the four precision tip members 124,126 (two are not shown), it will be appreciated that suitable alternative numbers of such components and/or configurations of such components are contemplated herein. Furthermore, although the disclosed concept has been described in association with the single hose 8, the single pipe member 102, and the single pump apparatus 10, it will be appreciated that suitable alternative numbers and/or configurations of such components are contemplated herein.

Accordingly, it will be appreciated that the disclosed concept provides for an improved (e.g., without limitation, easier to change cutting tool 6, longer lasting cutting tool 6, longer lasting machined part (e.g., separable electrical contact 12)) method of operating a cutting system 2, and collar assembly 100 and collar member 140 therefor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A collar member for a collar assembly of a cutting system, said cutting system comprising a spindle and a cutting tool coupled to said spindle, said collar assembly comprising a number of components and a gas flow system comprising a number of gas flow delivery apparatus and a number of conduits, said collar member comprising:
    a support portion structured to be coupled to said spindle; and
    a chamber portion extending from said support portion and being structured to be coupled to each of said number of components, said number of gas flow delivery apparatus, and said number of conduits,
    wherein said support portion has a side portion having an edge portion defining a thru hole in order to form a passageway from an interior of said support portion to an exterior thereof; wherein said chamber portion has a first number of edge portions and a second number of edge portions each defining a thru hole; wherein each of said first number of edge portions is structured to be coupled to a corresponding one of said number of gas flow delivery apparatus; wherein each of said second number of edge portions is structures to be coupled to a corresponding one of said number or conduits; wherein said first number of edge portions comprises a first edge portion; wherein said second number of edge portions comprises a second edge portion; wherein said chamber portion further comprises a third edge portion defining a thru hole; wherein said number of components comprises a pipe member; and wherein said third edge portion and said edge portion of said side portion are each structured to be coupled to said pipe member in order that the passageway passes through said chamber portion.

2. The collar member of claim 1 wherein said support portion has an annular-shaped end portion structured to encircle said spindle; wherein said end portion has a plurality of slits; and wherein the slits are generally evenly spaced from one another.

3. A collar member for a collar assembly of a cutting system, said cutting system comprising a spindle and a cutting tool coupled to said spindle, said collar assembly comprising a number of components and a gas flow system comprising a number of gas flow delivery apparatus and a number of conduits, said collar member comprising:
   a support portion structured to be coupled to said spindle; and
   a chamber portion extending from said support portion and being structured to be coupled to each of said number of components, said number of gas flow delivery apparatus, and said number of conduits,
   wherein said support portion has a side portion having an edge portion defining a thru hole in order to form a passageway from an interior of said support portion to an exterior thereof; wherein said chamber portion has a first number of edge portions and a second number of edge portions each defining a thru hole; wherein each of said first number of edge portions is structured to be coupled to a corresponding one of said number of gas flow delivery apparatus; wherein each of said second number of edge portions is structured to be coupled to a corresponding one of said number of conduits, wherein said chamber portion comprises a floor portion and a wall portion extending from and being disposed perpendicular to said floor portion; wherein each of said first number of edge portions is disposed in said wall portion; wherein each of said second number of edge portions is disposed in said floor portion; wherein said support portion is generally annular-shaped and has a diameter; wherein said wall portion comprises a first end portion, a second end portion disposed opposite the first end portion, and a middle portion extending between the first end portion and the second end portion; wherein the first end portion and the second end portion each extend from said support portion; wherein the middle portion is spaced from said support portion; and wherein the middle portion is generally planar and has a length substantially the same as the diameter.

4. A collar assembly for a cutting system, said cutting system comprising a spindle and a cutting tool coupled to said spindle, said collar assembly comprising:
   a number of components;
   a gas flow system comprising a number of gas flow delivery apparatus and a number of conduits; and
   a collar member comprising:
      a support portion structured to be coupled to said spindle, and
      a chamber portion extending from said support portion and being coupled to each of said number of components, said number of gas flow delivery apparatus, and said number of conduits,
   wherein said support portion has a side portion having an edge portion defining a thru hole in order to form a passageway from an interior of said support portion to an exterior thereof; wherein said chamber portion comprises a wall portion extending from said support portion; wherein said wall portion has an edge portion defining a thru hole; wherein said number of components comprises a pipe member coupled to each of said edge portion of said wall portion and said edge portion of said side portion in order that the passageway passes through said chamber portion; wherein said support portion is generally annular-shaped and has a diameter; wherein said wall portion comprises a first end portion, a second end portion disposed opposite the first end portion, and a middle portion extending between the first end portion and the second end portion; wherein the first end portion and the second end portion each extend from said support portion; wherein the middle portion is spaced from said support portion; and wherein the middle portion is generally planar and has a length substantially the same as the diameter.

5. The collar assembly of claim 4 wherein said gas flow system further comprises a number of precision tip members each coupled to a corresponding one of said number of conduits.

6. The collar assembly of claim 4 wherein said number of gas flow delivery apparatus is a number of cold gas guns.

7. The collar assembly of claim 4 wherein said chamber portion comprises a floor portion and a wall portion extending from and being disposed perpendicular to said floor portion; and wherein said number of components comprises an enclosure member coupled to said wall portion.

8. The collar assembly of claim 7 wherein said enclosure member is shaped substantially the same as said floor portion; and wherein said enclosure member is disposed opposite and is generally parallel with respect to said floor portion.

9. The collar assembly of claim 4 wherein said pipe member is welded to each of said edge portion of said wall portion and said edge portion of said side portion.

10. The collar assembly of claim 4 wherein said chamber portion has a first number of edge portions and a second number of edge portions each defining a thru hole; wherein each of said first number of edge portions is coupled to a corresponding one of said number of gas flow delivery apparatus; and wherein each of said second number of edge portions is coupled to a corresponding one of said number of conduits.

11. The collar assembly of claim 10 wherein said chamber portion comprises a floor portion and a wall portion extending from and being disposed generally perpendicular with respect to said floor portion; wherein each of said second number of edge portions is disposed in said floor portion; and wherein each of said second number of edge portions is disposed between said side portion and said wall portion.

12. A method of operating a cutting system, said cutting system comprising a spindle, a cutting tool coupled to said spindle, and a collar assembly, said collar assembly comprising a number of components and a collar member, said collar member comprising a support portion coupled to said spindle, and a chamber portion extending from said support portion and being coupled to each of said number of components, the method comprising the steps of:
   providing a side portion of said support portion with an edge portion defining a thru hole in order to form a passageway from an interior of said support portion to an exterior thereof;

coupling one of said number of components to said edge portion;

coupling a tubular member to said one of said number of components;

coupling a pump apparatus to said tubular member; and pumping oil from the interior of said support portion through said one of said number of components and said tubular member with said pump apparatus.

13. The method of claim 12 wherein the method further comprises the steps of:

providing a gas flow system with said collar assembly, said gas flow system comprising a number of gas flow delivery apparatus and a number of conduits each coupled to said collar member;

employing each of said number of gas flow delivery apparatus to deliver a corresponding flow of gas into said chamber portion;

mixing each corresponding flow of gas in said chamber portion; and passing the mixed gas through each of said number of conduits.

14. The method of claim 13 further comprising the step of:

exiting the mixed gas through each of said number of conduits at a temperature at or below 11 degrees Celsius.

15. The method of claim 13 wherein said cutting tool comprises a distal end portion disposed opposite said collar member; wherein said gas flow system further comprises a number of precision tip members each coupled to a corresponding one of said number of conduits; and wherein the method further comprises the step of:

passing the mixed gas through each of said precision tip members proximate said distal end portion.

* * * * *